(No Model.) 3 Sheets—Sheet 1.
F. L. O. WADSWORTH.
TELEMETER ATTACHMENT FOR TELESCOPES.
No. 536,493. Patented Mar. 26, 1895.
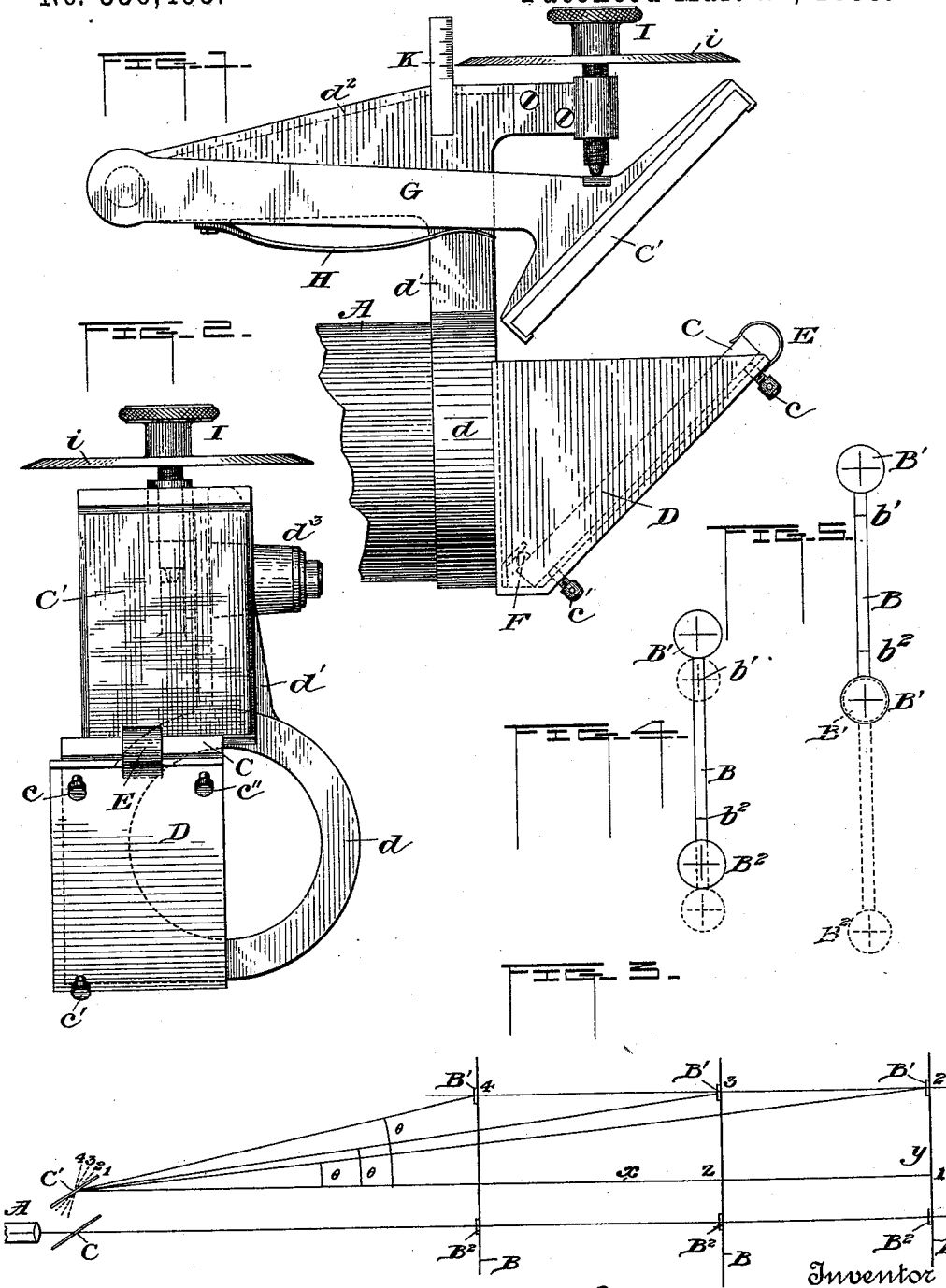
Witnesses
Inventor
Frank L. O. Wadsworth
By Geo. Whitney
Attorney

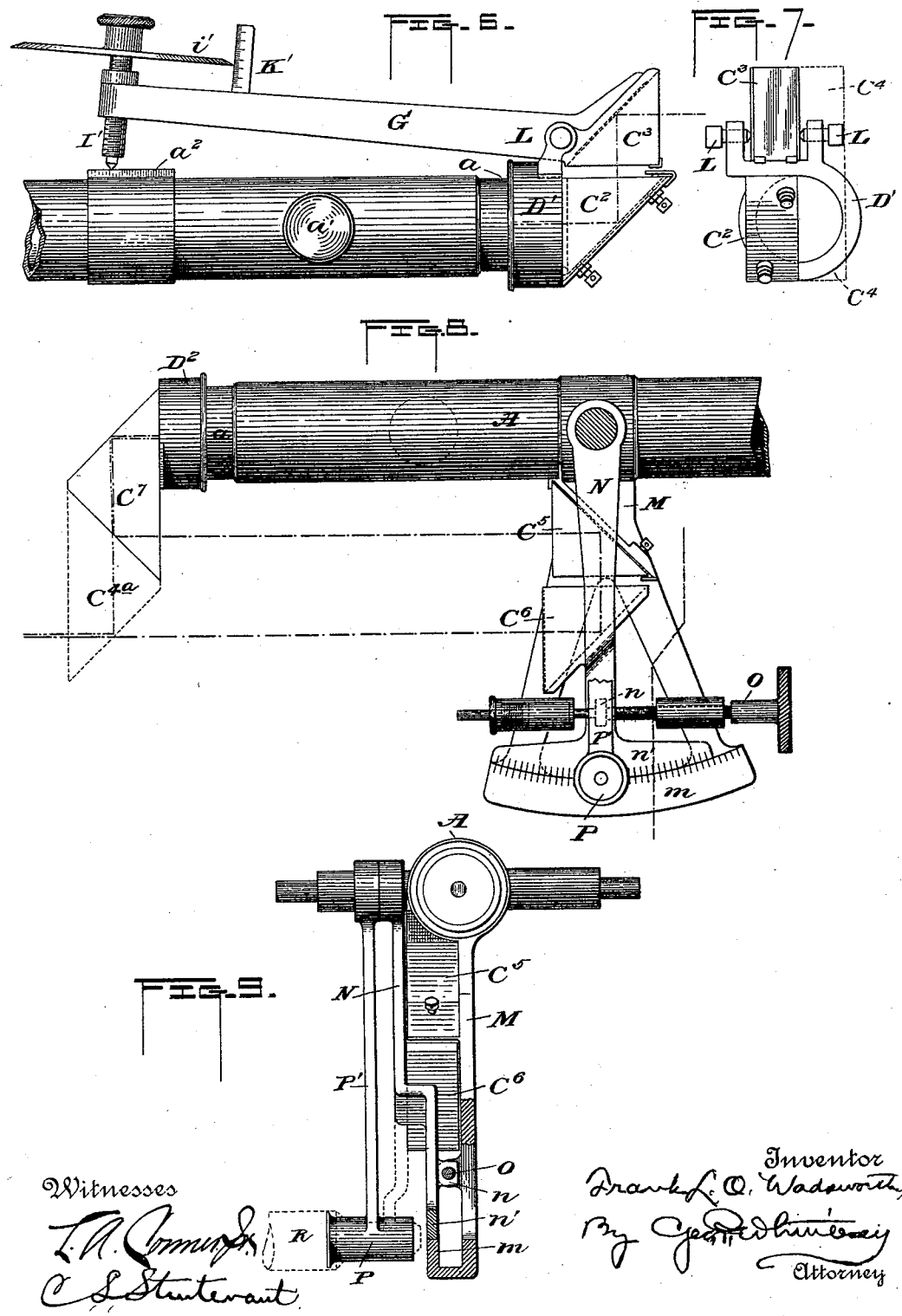

(No Model.) 3 Sheets—Sheet 3.
F. L. O. WADSWORTH.
TELEMETER ATTACHMENT FOR TELESCOPES.
No. 536,493. Patented Mar. 26, 1895.
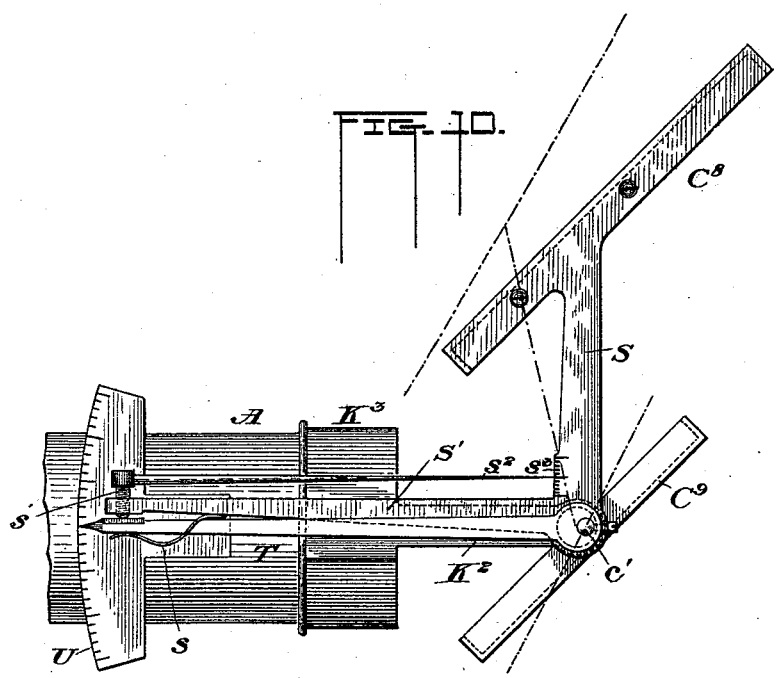
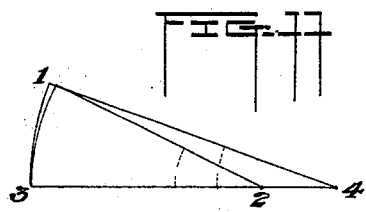
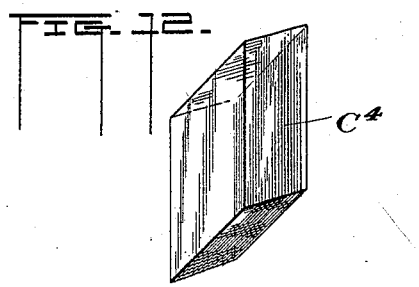
Witnesses
Inventor
Frank L. O. Wadsworth,
By
Attorney

UNITED STATES PATENT OFFICE.

FRANK LAWTON OLCOTT WADSWORTH, OF WASHINGTON, DISTRICT OF COLUMBIA.

TELEMETER ATTACHMENT FOR TELESCOPES.

SPECIFICATION forming part of Letters Patent No. 536,493, dated March 26, 1895.

Application filed December 28, 1893. Serial No. 494,991. (No model.)

*To all whom it may concern:*

Be it known that I, FRANK LAWTON OLCOTT WADSWORTH, a citizen of the United States, residing at Washington, in the District of Columbia, have invented certain new and useful Improvements in Telemeter Attachments for Telescopes; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to the art of measuring distances, and the object of my invention is to determine the distance between any two points in sight of each other without the use of a chain, with greater rapidity and accuracy than heretofore.

My invention consists in a new and improved method of determining distances and in convenient and novel apparatus adapted to ready use in the determination of distance by this new method, the construction and operation of which are hereinafter fully described.

To understand the novel features of the invention it will be well to briefly review the present state of the art and refer to the different methods of measurement of distance without the use of a chain or tape which is now used. In brief they all depend on a measurement of one side and two angles of a triangle, two of whose vertices are the points the distance between which is to be determined. In particular they may be divided into two general classes according to the position of the base line or measured side of the triangle with reference to the observer.

First. When the base line passes through the position of the observer, in which case the determination of the distance involves the measurement of the two angles between the base line and the lines from the extremity of the base to the distant object. The measurement in this case may be reduced in complexity, though not increased in accuracy, by placing at the two extremities of a known and fixed base two telescopes which are simultaneously directed at the distant object, the angle between their optical axes, viz., the angle subtended by the base line itself as viewed from the distant object, being determined either by means of two circle readings or by an automatic arrangement similar to that used in the Fiske range finder; or the two telescopes may be rigidly connected with their optical axes parallel, and the object brought on the cross wires of one by turning the whole system. The same object is brought on the cross wires of the second by deflecting the rays of light from the object before they reach the telescope either by reflection from a mirror whose angle is variable or by passage through a prism. In other cases one telescope is dispensed with by placing at one extremity of the base a reflecting mirror which reflects the rays from the distant object to a second mirror in front of the telescope at the other end of the base, which in turn reflects them into this telescope together with those coming directly from the object. By determining the divergence of these two sets of rays by the separation of the two images in the field of the telescope we can measure the angle subtended by the base line and therefore determine the distance.

Second. To the second class belong those methods in which the base is at the distant object. As it is to this class that the present invention relates we may with advantage consider them somwhat in detail. Devices of this class may be subdivided into two classes: First. Those in which the distance is determined by determining the length of the base line subtended by a fixed angle, at the observing telescope. To this class then belongs the stadia method of measurement, which consists in placing in the focal field of the telescope two fixed cross wires which being at a fixed distance apart subtend a known and fixed angle in the field of the telescope. We then observe the length of rod intercepted between these two wires, either by moving two targets on the rod until they coincide with the two cross wires, in which case the length of the rod is read off by the rodman, or else by reading directly on the face of the rod the intercepted distance, the rod being suitably graduated for that purpose. This method involves then either a setting and reading by the rodman or person in charge of the movable base, or second, a double reading (one for each wire) of the observer at the telescope. To this class also belong those instruments in which two images of a rod are formed in the field of the observing telescope by the use of a split objective or eye piece, or by the interposition of a prism in front of the objective covering one half the field, as in Richards' invention, the angular separation of the two images remaining constant and the distance of the rod being determined by their linear separation, this being ascertained either by moving a target on the rod until its two images are coincident, or by letting the observer at the telescope read on the rod itself the linear separation of the two images.

It will be noted that both these methods require either a setting and reading of the target by an assistant or else a visual reading by the observer of the graduations on the face of the rod.

To the second subdivision belong those methods in which the length of the rod or base line is kept constant and the distance determined by measurement of the angular value of the rod at the observing telescope. Heretofore the measurement of this angular value has in all devices employed for this purpose been made by setting the cross wire of the observing telescope first on one end or one target of the rod, and then on the other, and reading the angle through which the telescope is turned between the two settings. The objections to this method are, first, the doubling of the personal error of setting, introduced by the necessity for two settings in the method of measurement heretofore used; second, the time error caused by instrumental changes between the two settings; third, the time required to make a measurement by this method which is much greater than that required for example by the stadia method.

The method which I have invented to overcome these and other difficulties makes the rod a base line of fixed length, as in the last class, and determines the distance by the measurement of the angle which it subtends at the telescope.

The novelty of my invention then lies in the employment of a rod with two marks or targets at a fixed distance apart as opposed to one in which the distance is variable, and a means for measuring the angle subtended by this rod as viewed from the observing telescope by a single setting of an attachment secured to the telescope, as opposed to the measurement of this angle by two settings, between which the axis of the telescope is moved through the angle to be measured. The measurement by a single setting is accomplished by forming two images of the fixed rod, one of these images being movable in the field of the telescope with reference to the other in consequence of which they may be separated by the exact length of the rod, by bringing one image of the upper target into exact coincidence with the other image of the lower target. Further, this movement of the images is accomplished by the motion of one of the elements of the attachment to the telescope, the motion being measured on a suitable scale, the graduations in which are either arbitrary,—in which case the distance of the rod is determined by reference to a table,—or represent directly the distance in feet or yards of the rod from the instrument. This method of measuring the angle enables me to determine the distance between rod and telescope with greater accuracy and at the same time greater rapidity than heretofore, and to dispense if necessary with both cross wires and tripod or other support for the observing telescope. Greater accuracy is secured, first, by reason of the fact well known to those who have used a telescope that two objects may be brought into coincidence more accurately than the cross wires can be set on a single object; second, by reason of the fact that one setting is dispensed with; third, by reason of the fact that in consequence of this there is no error due to instrumental changes in the interval between two settings and the observation may be taken even when the rod or instrument is vibrating or swaying with the wind without affecting the accuracy of the result. Greater rapidity is secured, first, by measurement of the angle and hence determination of the distance at a single setting by direct reading on a scale if desired.

It will be understood that I know that the method of measuring angles between two objects by bringing them into coincidence in the field of a telescope by the aid of two mirrors one of which covers half the field of the telescope is not new, it having been used in the sextant for nearly two hundred years, but the combination of this means of measurement of an angle whose advantages have already been briefly alluded to with a portable telemeter rod of fixed length for the direct purpose of rapidly and accurately determining distances is the distinguishing novelty of my invention and it is to this general principle of measurement of distance that I wish especially hereinafter to lay claim as new.

To carry out my method I have devised several forms of telemeters, all adapted to be readily attached to or detached from an ordinary surveyor's telescope, and consisting of two or more mirrors or total reflection prisms so disposed in the line of sight that when the telescope is directed at the rod two images of the latter are seen, one by a series of reflections through a train of reflecting mirrors or total reflection prisms, the reflecting surface of which is movable with respect to the reflecting surface of the others, and the other image, either directly, or by a series of reflections through a train of reflecting mirrors or total reflection prisms all of whose surfaces are fixed with reference to each other. By the relative movement of the surfaces of the first train the corresponding image may be moved with reference to the other, so as to separate these two images by the exact length of the rod as heretofore described. This relative movement is accomplished by a rotation of one or in some cases two of the reflecting surfaces about an axis or axes parallel to the plane of the mirrors and at right angles to the line of sight.

In the drawings Figure 1 is a side elevation of one form of attachment in which mirrors are used. Fig. 2 is a front elevation thereof. Fig. 3 is a diagram showing the principle of the operation of my telemeter. Figs. 4 and 5 show different views of the rod, provided with two targets. Fig. 6 is a side elevation and Fig. 7 an end view of an attachment in which total reflection prisms are used. Figs. 8 and 9 are respectively similar views of a modification thereof. Figs. 10 and 11 are similar views of a further modification and Fig. 12 shows a double total reflection prism.

The telescope A is of the usual construction, either with or without cross wires, and mounted on a tripod, or not, as may be desired. The rod B is provided with two targets $B'$ $B^2$ rigidly fixed thereto or formed thereon at a carefully measured distance apart. The rod also has, preferably, two marks $b'$ $b^2$ near each end.

The four modifications of my telemeter attachment will now be described in succession. That shown in Figs. 1 and 2 is composed of two plane mirrors C C' the former being rigidly fastened in a frame D having a short tube $d$ adapted to slip easily upon the object glass end of the telescope, where it can be fastened in any desired manner, so as not to interfere with or be affected by the focusing of the telescope, which in a surveyor's telescope is usually accomplished by moving the object glass. The mirror C may be mounted in the frame in any suitable way, but I prefer to press it firmly by means of set screws $c$ against yielding abutments, such as the spring E and the piece of cork F, which permit a slight adjustment with reference to the axis of the telescope, for the purpose hereinafter to be described. This mirror covers one half of the field of the telescope, on one side of a vertical diameter as shown in Fig. 2. It is adjusted approximately to an angle of forty-five degrees with the line of vision. Rising from the tube $d$ is a standard $d'$ having a rearwardly extending arm $d^2$ at the extremity of which is a lateral boss $d^3$ in which is journaled a wrist pin supporting a bar G which carries at its front end the mirror C', located above the mirror C and parallel therewith in its lowest position. A spring H attached to the arm $d^2$ presses the bar G up against the end of a micrometer screw I tapped into a projection on the standard $d'$, and carrying a graduated disk $i$ whose edge lies adjacent to a graduated scale K fixed upon the standard $d'$. When the screw is turned the mirror C' changes its position, being lifted by the spring H, and turning around the axis of the wrist pin in the boss $d^3$, said axis being transverse to the line of sight, and also to the rod B. By means of the disk $i$ and scale K, the angular change or divergence between the planes of the two mirrors can be accurately measured.

When a telescope provided with this attachment is directed at a rod provided with two targets, one image of these targets will be seen directly through the uncovered half of the object glass. Another image will be seen by reflection from the two mirrors C C' and if these mirrors C C' are parallel to each other and perpendicular to the plane which contains the rod and the axis of the telescope this second image will be superposed on the first as shown in Fig. 4 where the second image is shown dotted, the images being separated longitudinally by an amount equal to C C', the distance between the two mirrors. In this position the reading of the screw should be 0.

In Fig. 3, the mirrors for the sake of clearness are shown much farther apart relatively to the targets than is actually the case. In practice the mirrors are less than two inches apart, while the targets are separated preferably about ten to twelve feet for distances ranging up to three thousand feet. Now by moving the mirror C' (by means of the screw) until the reflected image of the upper target B' is made to coincide with the image of the lower target $B^2$ (see Fig. 5) we can measure at once the angle $\theta$ between the lines C' B' and C $B^2$, since this angle is just twice the angle through which the mirror C' has been moved, and this angle is measured directly by noting the reading of the screw. The distance is then readily determined from the formula $x$ equals $\dfrac{y}{\tang. 2\theta}$, where $y$ equals distance between the centers of the targets less the distance between the mirrors, viz., equals $B' B^2 - C C'$, equals $B' z$, and $\theta$ equals angle through which the mirror has moved, or since the angular movement of the mirror C' is measured by the linear movement $t$ of the screw I whose axis is at a distance $r$ from the point of rotation (the pivot of the arm G) tangent $\theta$ equals $\dfrac{t}{r}$. Strictly also in this form C C' is also a variable and is equal to (C C'$+r$ tangent $\theta$); but since $\theta$ is small and $r$ is also small compared to $x$ and $y$ we may neglect this quantity except in very accurate work. Hence $x = \dfrac{y\ r}{2t}$—that is, the distance of the rod is reversely proportional to the movement of the screw required to produce coincidence. It must be noted that this distance is measured not from the center of the instrument but from the line C C'.

The object of the marks $b'$ $b^2$ on the rod is to enable the mirrors C C' to be set to exact parallelism for the zero position of the screw and furnish a means of readily testing that parallelism at any time when the rod is at any distance from the instrument. To do this it is only necessary that the marks should be just the distance C C' from the center of the targets. Then when the screw is turned to O and the telescope directed at the rod the marks on one image should coincide exactly with the targets in the other image. If they do not so coincide they are made to do so by a minute adjustment of the lower mirror C by means of the screw $c'$. In the operation of measuring distances it is only necessary under ordinary cicumstances to verify the correctness of this zero for every forty or fifty consecutive measurements, and not even then unless great accuracy is demanded. The mirror C is also provided with slight angular adjustment at right angles to that just described by means of screw $c''$, the object being if desired to obtain a slight lateral separation of the two images.

In the modification shown on Sheet 2 of the drawings, the mirrors are replaced by total reflection prisms with the object of avoiding the silvering necessary when mirrors are used.

Fig. 6 shows the front end of the telescope with its object glass tube $a$ movable by means of the milled head $a'$, as usual. Slipped upon the end of the tube is the frame D' carrying a fixed prism $C^2$. Hinged upon screws L carried in ears on the top of the frame D', and transverse to the axis of the telescope and to the line joining the targets is an arm G' to the front end of which is secured the movable prism $C^3$, placed with its reflecting side (the hypotenuse of the triangle) normally parallel with the similar side of the prism $C^2$. A ray of light striking the prism $C^3$ will therefore be reflected into the telescope, as shown by the dotted line. The end of the arm G' has a screw I' tapped through it, the point of the screw resting on a plane surface $a^2$ parallel with the axis of the telescope, so that axial movement of the frame D' will not vary the angle of the arm G' to the axis of the telescope. The screw carries a graduated disk $i'$ co-operating with a scale K' mounted on the arm G'. The prism $C^2$ covers one half the field of the telescope, as shown in Fig. 7, the other half being either left uncovered, or provided with a double total reflection prism $C^4$, in order that the two images of the rod may be seen under the same optical conditions and therefore appear equally illuminated in the field of the telescope. When the double prism is omitted, the image seen directly is more brightly illuminated, and it is not so easy to determine when the two images exactly coincide. The double total reflection prism also avoids the necessity for correcting the length of the rod by the quantity $B^2 z$, since the two images are reflected from two surfaces placed at the same level, to wit: the rear surface of the prism $C^3$ and the rear surface of the upper part of the double prism $C^4$.

In this attachment, as in the preceding one, the system of reflectors is moved with the object glass in focusing the instrument, and hence if we wish to measure from the center of the instrument we must add to the distance $x$ a distance equal to the distance of the line $C^2 C^3$ from the center of the instrument.

The modification shown in Figs. 8 and 9 avoids the necessity for this correction. The fixed total reflection prism $C^5$ is mounted on a hanger M secured to the telescope at its horizontal transverse axis of movement. The movable total reflection prism $C^6$ is located below the prism $C^5$, and the ray coming to it and reversed in its direction by the two prisms is again reversed and thrown into the telescope by a double total reflection prism $C^7$ having its reflecting surfaces perpendicular to each other, and secured to a ring $D^2$ mounted on the front end of the telescope. The path of the ray between the prisms $C^5$ $C^7$ is parallel with the axis of the telescope, so that the axial movement of the prism $C^7$ when the object glass is adjusted does not affect the operation of the instrument. The movable prism $C^6$ is attached to a radius arm N pivoted on the cross axis of the telescope, and adjusted by the usual tangent screw O bearing against the lug $n$ on the arm. The angular movement of the arm and hence of the reflecting prism may be measured by any suitable means of the requisite delicacy such as a long vernier $m$ $n'$ read by a high power eye piece P attached to a radius rod P' so as to swing over the graduated arcs $m$ $n'$. In place of this arrangement the arm N may carry a reading microscope R (shown in dotted lines) by means of which the graduation on the arc $m$ can be read. A second total reflection prism $C^{4a}$ with parallel reflecting surfaces may be placed in front of the other half of the objective, as indicated in dotted lines in Fig. 8, the object being as in the second modification to avoid the correction for C C' to the length of the rod and to secure equal illumination of the two images.

In Figs. 10 and 11 is shown a further modification in which only two mirrors are used, but both rotate about axes parallel to each other and transverse to the line of sight and the axis of the instrument. The object of this modification is to secure a small relative angular motion between the surfaces by means of comparatively large angular motion of the mirror system as a whole, thus enabling the angular motion to be read off with sufficient accuracy on an open scale without the aid of any screw vernier or microscope. To secure this object the upper mirror $C^8$ is secured to the upper end of a pair of rock arms S journaled on a horizontal axis on the ends of arms $K^2$ projecting from the ring $K^3$ on the front end of the telescope. Passing eccentrically through these journals are the pivots $c'$ of the lower mirror $C^9$. To one of these pivots a pointer T is secured, and the adjacent be moved with reference to the other, so as to separate these two images by the exact length of the rod as heretofore described. This relative movement is accomplished by a rotation of one or in some cases two of the reflecting surfaces about an axis or axes parallel to the plane of the mirrors and at right angles to the line of sight.

In the drawings Figure 1 is a side elevation of one form of attachment in which mirrors are used. Fig. 2 is a front elevation thereof. Fig. 3 is a diagram showing the principle of the operation of my telemeter. Figs. 4 and 5 show different views of the rod, provided with two targets. Fig. 6 is a side elevation and Fig. 7 an end view of an attachment in which total reflection prisms are used. Figs. 8 and 9 are respectively similar views of a modification thereof. Figs. 10 and 11 are similar views of a further modification and Fig. 12 shows a double total reflection prism.

The telescope A is of the usual construction, either with or without cross wires, and mounted on a tripod, or not, as may be desired. The rod B is provided with two targets $B'$ $B^2$ rigidly fixed thereto or formed thereon at a carefully measured distance apart. The rod also has, preferably, two marks $b'$ $b^2$ near each end.

The four modifications of my telemeter attachment will now be described in succession. That shown in Figs. 1 and 2 is composed of two plane mirrors C C' the former being rigidly fastened in a frame D having a short tube $d$ adapted to slip easily upon the object glass end of the telescope, where it can be fastened in any desired manner, so as not to interfere with or be affected by the focusing of the telescope, which in a surveyor's telescope is usually accomplished by moving the object glass. The mirror C may be mounted in the frame in any suitable way, but I prefer to press it firmly by means of set screws $c$ against yielding abutments, such as the spring E and the piece of cork F, which permit a slight adjustment with reference to the axis of the telescope, for the purpose hereinafter to be described. This mirror covers one half of the field of the telescope, on one side of a vertical diameter as shown in Fig. 2. It is adjusted approximately to an angle of forty-five degrees with the line of vision. Rising from the tube $d$ is a standard $d'$ having a rearwardly extending arm $d^2$ at the extremity of which is a lateral boss $d^3$ in which is journaled a wrist pin supporting a bar G which carries at its front end the mirror C', located above the mirror C and parallel therewith in its lowest position. A spring H attached to the arm $d^2$ presses the bar G up against the end of a micrometer screw I tapped into a projection on the standard $d'$, and carrying a graduated disk $i$ whose edge lies adjacent to a graduated scale K fixed upon the standard $d'$. When the screw is turned the mirror C' changes its position, being lifted by the spring H, and turning around the axis of the wrist pin in the boss $d^3$, said axis being transverse to the line of sight, and also to the rod B. By means of the disk $i$ and scale K, the angular change or divergence between the planes of the two mirrors can be accurately measured.

When a telescope provided with this attachment is directed at a rod provided with two targets, one image of these targets will be seen directly through the uncovered half of the object glass. Another image will be seen by reflection from the two mirrors C C' and if these mirrors C C' are parallel to each other and perpendicular to the plane which contains the rod and the axis of the telescope this second image will be superposed on the first as shown in Fig. 4 where the second image is shown dotted, the images being separated longitudinally by an amount equal to C C', the distance between the two mirrors. In this position the reading of the screw should be 0.

In Fig. 3, the mirrors for the sake of clearness are shown much farther apart relatively to the targets than is actually the case. In practice the mirrors are less than two inches apart, while the targets are separated preferably about ten to twelve feet for distances ranging up to three thousand feet. Now by moving the mirror C' (by means of the screw) until the reflected image of the upper target $B'$ is made to coincide with the image of the lower target $B^2$ (see Fig. 5) we can measure at once the angle $\theta$ between the lines C' $B'$ and C $B^2$, since this angle is just twice the angle through which the mirror C' has been moved, and this angle is measured directly by noting the reading of the screw. The distance is then readily determined from the formula $x$ equals $\dfrac{y}{\tang. 2\theta}$, where $y$ equals distance between the centers of the targets less the distance between the mirrors, viz., equals $B'$ $B^2$ — C C', equals $B'$ $z$, and $\theta$ equals angle through which the mirror has moved, or since the angular movement of the mirror C' is measured by the linear movement $t$ of the screw I whose axis is at a distance $r$ from the point of rotation (the pivot of the arm G) tangent $\theta$ equals $\dfrac{t}{r}$. Strictly also in this form C C' is also a variable and is equal to (C C'$+r$ tangent $\theta$); but since $\theta$ is small and $r$ is also small compared to $x$ and $y$ we may neglect this quantity except in very accurate work. Hence $x=\dfrac{y\,r}{2t}$—that is, the distance of the rod is reversely proportional to the movement of the screw required to produce coincidence. It must be noted that this distance is measured not from the center of the instrument but from the line C C'.

The object of the marks $b'$ $b^2$ on the rod is to enable the mirrors C C' to be set to exact parallelism for the zero position of the screw and furnish a means of readily testing that parallelism at any time when the rod is at any distance from the instrument. To do this it is only necessary that the marks should be just the distance C C' from the center of the targets. Then when the screw is turned to O and the telescope directed at the rod the marks on one image should coincide exactly with the targets in the other image. If they do not so coincide they are made to do so by a minute adjustment of the lower mirror C by means of the screw $c'$. In the operation of measuring distances it is only necessary under ordinary cicumstances to verify the correctness of this zero for every forty or fifty consecutive measurements, and not even then unless great accuracy is demanded. The mirror C is also provided with slight angular adjustment at right angles to that just described by means of screw $c''$, the object being if desired to obtain a slight lateral separation of the two images.

In the modification shown on Sheet 2 of the drawings, the mirrors are replaced by total reflection prisms with the object of avoiding the silvering necessary when mirrors are used.

Fig. 6 shows the front end of the telescope with its object glass tube $a$ movable by means of the milled head $a'$, as usual. Slipped upon the end of the tube is the frame D' carrying a fixed prism $C^2$. Hinged upon screws L carried in ears on the top of the frame D', and transverse to the axis of the telescope and to the line joining the targets is an arm G' to the front end of which is secured the movable prism $C^3$, placed with its reflecting side (the hypotenuse of the triangle) normally parallel with the similar side of the prism $C^2$. A ray of light striking the prism $C^3$ will therefore be reflected into the telescope, as shown by the dotted line. The end of the arm G' has a screw I' tapped through it, the point of the screw resting on a plane surface $a^2$ parallel with the axis of the telescope, so that axial movement of the frame D' will not vary the angle of the arm G' to the axis of the telescope. The screw carries a graduated disk $i'$ co-operating with a scale K' mounted on the arm G'. The prism $C^2$ covers one half the field of the telescope, as shown in Fig. 7, the other half being either left uncovered, or provided with a double total reflection prism $C^4$, in order that the two images of the rod may be seen under the same optical conditions and therefore appear equally illuminated in the field of the telescope. When the double prism is omitted, the image seen directly is more brightly illuminated, and it is not so easy to determine when the two images exactly coincide. The double total reflection prism also avoids the necessity for correcting the length of the rod by the quantity $B^2 z$, since the two images are reflected from two surfaces placed at the same level, to wit: the rear surface of the prism $C^3$ and the rear surface of the upper part of the double prism $C^4$.

In this attachment, as in the preceding one, the system of reflectors is moved with the object glass in focusing the instrument, and hence if we wish to measure from the center of the instrument we must add to the distance $x$ a distance equal to the distance of the line $C^2 C^3$ from the center of the instrument.

The modification shown in Figs. 8 and 9 avoids the necessity for this correction. The fixed total reflection prism $C^5$ is mounted on a hanger M secured to the telescope at its horizontal transverse axis of movement. The movable total reflection prism $C^6$ is located below the prism $C^5$, and the ray coming to it and reversed in its direction by the two prisms is again reversed and thrown into the telescope by a double total reflection prism $C^7$ having its reflecting surfaces perpendicular to each other, and secured to a ring $D^2$ mounted on the front end of the telescope. The path of the ray between the prisms $C^5$ $C^7$ is parallel with the axis of the telescope, so that the axial movement of the prism $C^7$ when the object glass is adjusted does not affect the operation of the instrument. The movable prism $C^6$ is attached to a radius arm N pivoted on the cross axis of the telescope, and adjusted by the usual tangent screw O bearing against the lug $n$ on the arm. The angular movement of the arm and hence of the reflecting prism may be measured by any suitable means of the requisite delicacy such as a long vernier $m$ $n'$ read by a high power eye piece P attached to a radius rod P' so as to swing over the graduated arcs $m$ $n'$. In place of this arrangement the arm N may carry a reading microscope R (shown in dotted lines) by means of which the graduation on the arc $m$ can be read. A second total reflection prism $C^{4a}$ with parallel reflecting surfaces may be placed in front of the other half of the objective, as indicated in dotted lines in Fig. 8, the object being as in the second modification to avoid the correction for C C' to the length of the rod and to secure equal illumination of the two images.

In Figs. 10 and 11 is shown a further modification in which only two mirrors are used, but both rotate about axes parallel to each other and transverse to the line of sight and the axis of the instrument. The object of this modification is to secure a small relative angular motion between the surfaces by means of comparatively large angular motion of the mirror system as a whole, thus enabling the angular motion to be read off with sufficient accuracy on an open scale without the aid of any screw vernier or microscope. To secure this object the upper mirror $C^8$ is secured to the upper end of a pair of rock arms S journaled on a horizontal axis on the ends of arms $K^2$ projecting from the ring $K^3$ on the front end of the telescope. Passing eccentrically through these journals are the pivots $c'$ of the lower mirror $C^9$. To one of these pivots a pointer T is secured, and the adjacent rock arm S has a horizontal arm or elbow S' parallel with the pointer and provided with a transverse screw s bearing against the pointer and held yieldingly in place by a spring s'. The pointer vibrates over a graduated scale U fixed to the telescope, and the screw s has a finger $s^2$ whose tip lies adjacent to a scale $s^3$ on the rock arm S.

Upon reference to the diagram, Fig. 11, it is plain that a given arc on the scale U subtends a greater angle at the axis of rotation of the rock arm S than at the axis of the pivots c', the latter being farther from the scale than the former. Hence when the arm S' and pointer T are simultaneously moved, and the position of the system of mirrors $C^8$ $C^9$ is changed, their relative positions are also changed by an amount equal to the difference between the angles 1, 2, 3 and 1, 4, 3 in Fig. 11, that is, the angular divergence of the mirrors is equal to the angle 2, 1, 4.

The parts may be so proportioned that a movement of the arm S' and pointer T over the entire scale U (about thirty degrees) will cause a divergence of the mirrors of but one half a degree; but since it is necessary to obtain a divergence of about two and one-half degrees for a range of distance from naught up to four thousand feet, the screw s' has been provided. The pitch of the screw is such that one turn (or any given number of turns) will separate the arm S' and pointer T by an amount sufficient to affect the relative positions of the mirrors to an extent equal to a traversing of the entire scale U by the combined arm and pointer. The amount of divergence thus obtained may be increased by minute increments by moving the pointer and arm over the scale as before. A further divergence is obtainable by giving the screw s' another turn (or a given number of turns), the finger $s^2$ indicating the number on the scale $s^3$.

In conclusion it will be observed that the arrangement of mirror surfaces in all of these modifications is such that a motion of the attachment as a whole or of the mirror systems as a whole is without effect on the accuracy of the result. Hence no care need be taken to adjust the attachment with reference to the axis of the telescope, but the same may be readily taken off and replaced whenever it is desired to use it, without interfering with the ordinary use of the instrument.

The details of construction shown and described are not deemed absolutely essential. For instance the arm G in Fig. 1 may be of any convenient length and the pivot about which it turns may be placed at any point so long as the axis of rotation is perpendicular to the line of sight and the line joining the two targets. Again, the joint movement of both mirrors as shown in the fourth modification, or the double total reflection prism, or its equivalent combination of mirrors, may be used in any one of the four forms shown for the purpose heretofore described.

Various other modifications in the construction of the mirrors and the means for measuring the angles, such as will occur to persons skilled in the art, may be adopted.

Having thus described my invention, what I claim is—

1. The means for determining distances herein shown and described, consisting of a portable rod having two targets fixed a known distance apart, and a device movable transverse to the line of sight for deflecting the image of one of said targets until it coincides with that of the other, substantially as described.

2. The means for determining distances herein shown and described, consisting of a portable rod having two targets fixed a known distance apart, and a device rotatable on an axis for deflecting the image of one of said targets until it coincides with that of the other, substantially as described.

3. An apparatus for determining distances consisting of a rod having two fixed targets at a known and predetermined distance apart, and a telescope provided with two or more closely adjacent reflecting surfaces one of which is movable with respect to the others, whereby the images of the two targets can be brought into coincidence, substantially as described.

4. An apparatus for determining distances consisting of a rod having two fixed targets, separated a known distance apart, and a telescope provided with two closely adjacent reflectors covering one half of the field, and relatively movable from a position parallel with each other, substantially as described.

5. An apparatus for determining distances consisting of a rod provided with two fixed targets, and a telescope provided with two closely adjacent reflectors relatively movable on an axis transverse to the line of sight and to the line joining the targets, substantially as described.

6. An apparatus for determining distances, consisting of a rod provided with two fixed targets, and a telescope provided with a frame, a reflector mounted in the frame and covering half the field of the telescope, an arm hinged to said frame on an axis transverse to the line of sight, a graduated scale for determining the movement of said arm, and a second reflector attached to said arm in line with the first reflector and closely adjacent thereto, substantially as described.

7. The combination with a telescope having a system of adjustable reflectors intercepting the rays entering one-half the field, of a double total reflection prism covering the other half of the field, substantially as described.

8. The combination with a telescope having an axially adjustable objective, of a system of reflectors supported adjacent to the cross axis of the telescope, and a double total reflection prism mounted on the tube holding the objective, substantially as described.

9. The combination with a telescope having an axially movable objective of a hanger M near the cross axis of the telescope, a total reflection prism secured to said hanger, a similar prism secured to a radius arm N, and a double total reflection prism mounted on the objective tube, substantially as described.

In testimony whereof I affix my signature in presence of two witnesses.

FRANK LAWTON OLCOTT WADSWORTH.

Witnesses:
GEO. P. WHITTLESEY,
FRANK D. BLACKISTONE.